United States Patent
Dai (10) Patent No.: US 10,048,363 B2
(45) Date of Patent: Aug. 14, 2018

(54) RADAR DEVICE AND RADAR IMAGE DISPLAY METHOD

(71) Applicant: FURUNO ELECTRIC CO., LTD., Nishinomiya, Hyogo (JP)

(72) Inventor: Koji Dai, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 493 days.

(21) Appl. No.: 14/443,289

(22) PCT Filed: Nov. 5, 2013

(86) PCT No.: PCT/JP2013/079823
§ 371 (c)(1),
(2) Date: May 15, 2015

(87) PCT Pub. No.: WO2014/077149
PCT Pub. Date: May 22, 2014

(65) Prior Publication Data
US 2017/0322297 A1 Nov. 9, 2017

(30) Foreign Application Priority Data

Nov. 16, 2012 (JP) .................................. 2012-252641

(51) Int. Cl.
*G01S 13/30* (2006.01)
*G01S 13/22* (2006.01)
(Continued)

(52) U.S. Cl.
CPC .............. *G01S 13/22* (2013.01); *G01S 7/12* (2013.01); *G01S 7/282* (2013.01); *G01S 7/295* (2013.01);
(Continued)

(58) Field of Classification Search
CPC .................................. G01S 13/22; G01S 7/12
(Continued)

(56) References Cited

U.S. PATENT DOCUMENTS 5,057,845 A * 10/1991 Gellekink ............. G01S 13/106
342/137
7,696,921 B1 * 4/2010 Finley ..................... G01S 7/062
342/26 B
(Continued)

FOREIGN PATENT DOCUMENTS

JP 2000-206225 A 7/2000
JP 2002-214342 A 7/2002
(Continued)

OTHER PUBLICATIONS

International Search Report of the corresponding International Application No. PCT/JP2013/079823, dated Dec. 3, 2013.

*Primary Examiner* — Marcus E Windrich
(74) *Attorney, Agent, or Firm* — Studebaker & Brackett PC (57) ABSTRACT

A radar device comprises a transmitter, a receiver, a first radar image production component, a second radar image production component, a display component, and an echo width adjuster. The transmitter transmits a pulse signal. The receiver receives an echo signal during a transmission and reception period of the pulse signal. The first radar image production component produces a radar image of a first display range on the basis of the echo signal. The second radar image production component produces a radar image of a second display range that is wider than the first display range on the basis of the echo signal. The display component selectively or simultaneously displays the radar image of the first display range and the radar image of the second display range. The echo width adjuster adjusts pulse width of echo included in the radar images or the echo signal according to the display range of the radar image.

12 Claims, 6 Drawing Sheets

(51) Int. Cl.
- *G01S 13/90* (2006.01)
- *G01S 13/93* (2006.01)
- *G01S 13/28* (2006.01)
- *G01S 7/12* (2006.01)
- *G01S 13/12* (2006.01)
- *G01S 7/282* (2006.01)
- *G01S 7/295* (2006.01)

(52) U.S. Cl.
 CPC .............. *G01S 13/12* (2013.01); *G01S 13/28* (2013.01); *G01S 13/30* (2013.01); *G01S 13/90* (2013.01); *G01S 13/9307* (2013.01)

(58) Field of Classification Search
 USPC .......................................... 342/41, 202, 204
 See application file for complete search history.

(56) References Cited

U.S. PATENT DOCUMENTS

| | | | |
|---|---|---|---|
| 7,768,447 B2 | 8/2010 | Pryszo et al. | |
| 7,956,798 B2 | 6/2011 | Yanagi et al. | |
| 2007/0252751 A1 | 11/2007 | Nakahama et al. | |
| 2008/0100503 A1* | 5/2008 | Yanagi | G01S 7/064 342/176 |
| 2008/0136704 A1* | 6/2008 | Chan | G01S 7/282 342/201 |
| 2010/0225525 A1* | 9/2010 | Takase | G01S 7/2926 342/134 |
| 2010/0321231 A1* | 12/2010 | Nakahama | G01S 7/062 342/118 |
| 2011/0001661 A1* | 1/2011 | Ohnishi | G01S 13/30 342/202 |
| 2013/0088380 A1* | 4/2013 | Isoda | G01S 7/285 342/109 |
| 2013/0278455 A1* | 10/2013 | Song | G01S 13/22 342/137 |

FOREIGN PATENT DOCUMENTS

| | | | |
|---|---|---|---|
| JP | 2002-243842 A | | 8/2002 |
| JP | 2002243842 A | * | 8/2002 |
| JP | 2007-298417 A | | 11/2007 |
| JP | 2007-333482 A | | 12/2007 |
| JP | 2008-175582 A | | 7/2008 |
| JP | 2009-058512 A | | 3/2009 |

* cited by examiner

(A) DUAL-SCREEN SIMULTANEOUS DISPLAY MODE (PRIOR ART)

FIG. 3(a)

(B) PULSE COMPRESSION RADAR (PRIOR ART)

FIG. 3(b)

(C) PULSE COMPRESSION RADAR + DUAL-SCREEN SIMULTANEOUS DISPLAY MODE (PRIOR ART)

RADAR DEVICE AND RADAR IMAGE DISPLAY METHOD

CROSS REFERENCE TO RELATED APPLICATIONS

This application is a U.S. National stage of International Application No. PCT/JP2013/079823 filed on Nov. 5, 2013. This application claims priority to Japanese Patent Application No. 2012-252641 filed on Nov. 16, 2012. The entire disclosure of Japanese Patent Application No. 2012-252641 is hereby incorporated herein by reference.

BACKGROUND

Field of the Invention

The present invention mainly relates to a radar device with which radar images of a plurality of display ranges can be displayed either simultaneously or one by one.

Background Information

Radar images of different display ranges are used according to the objective at hand in marine radar devices and the like. For example, if the user wants to check what the exact situation is around his vessel, he uses a radar image with a narrow display range. If the user wants to check on the situation farther away, he uses a radar image with a wide display range.

With a radar device of this type, the pulse width of the pulse signals that will be transmitted is determined ahead of time according to the display range of the radar images. For instance, if a radar image has a narrow display range, a pulse signal is transmitted at a relatively narrow pulse width. This allows the distance resolution to be increased, and therefore is useful when the user wants to check on the exact situation near his vessel.

On the other hand, if the display range is wide, the signal-to-noise power ratio of the echo signal from a target may decrease, which would lower the visibility of the echo image on the radar image. In view of this, when the display range of a radar image is wide, a pulse signal is transmitted at a relatively wide pulse width. Consequently, the pulse width of the echo from the target will also be wider, so the signal-to-noise power ratio of the echo signal from the target will increase, and the visibility of this echo image will be better.

As discussed above, with a conventional radar device, the pulse width of a transmitted pulse signal varies with the display range.

Japanese Laid-Open Patent Application Publication No. 2007-298417 (Patent Literature 1) discloses a radar device featuring a "dual-screen simultaneous display mode" in which two radar images of different display ranges are produced and simultaneously displayed.

Figure 3A:
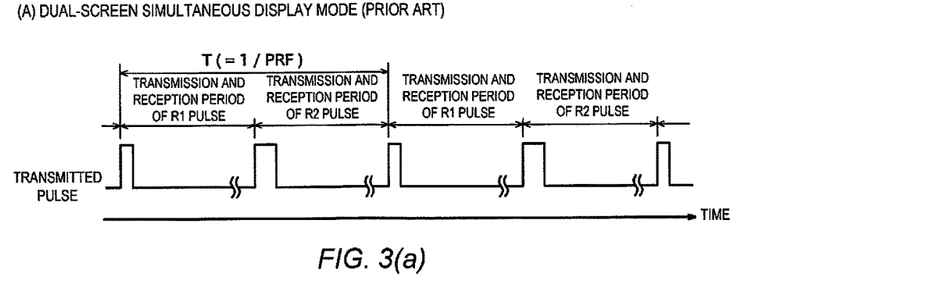
FIGS. 3(a), 3(b) and 3(c) show examples of pulse signals transmitted by a conventional radar device.

As shown in FIG. 3(a), for example, the configuration of Patent Literature 1 is such that a pulse signal for use with a display range R1 and a pulse signal for use with a display range R2 are transmitted alternately. A radar image for the display range R1 is produced on the basis of the echo obtained during the transmission and reception period of the R1 pulse signal, and a radar image for the display range R2 is produced on the basis of the echo obtained during the transmission and reception period of the R2 pulse signal. The proper radar image for each display range can be produced by properly setting the pulse width for the R1 and R2 pulse signals according to the respective display ranges.

Apart from this, there is a known pulse compression radar device. With pulse compression radar, a pulse signal that has undergone frequency modulation (modulated pulse) is transmitted, and the echo received from the surroundings is subjected to pulse compression processing, which enhances the S/N ratio.

From the standpoint of improving the S/N ratio after pulse compression, it preferable for the transmitted modulated pulse to have a wider pulse width. If the pulse width of the modulated pulse is increased, however, a problem is that there is a larger blind zone (in which echoes cannot be received from short distances) during the transmission and reception period of this modulated pulse.

Figure 3B:
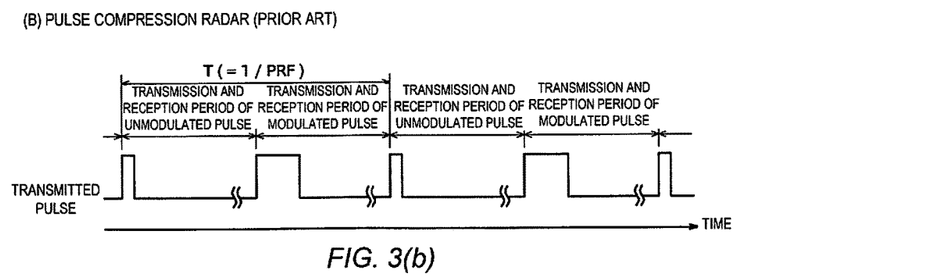
Figure 4:
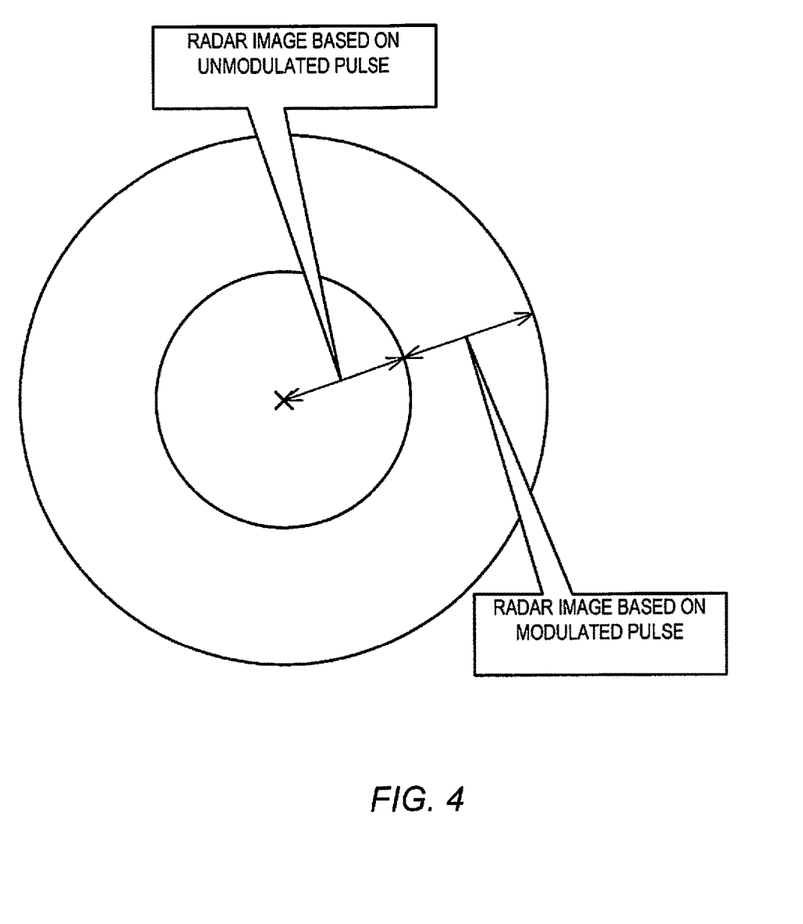
FIG. 4 is a diagram illustrating a radar image based on a composite pulse signal obtained by synthesizing an unmodulated pulse and a modulated pulse.

In view of this, an unmodulated pulse (a pulse signal that has not undergone frequency modulation) with a narrow pulse width is sometimes used in order to compensate for the blind zone of the modulated pulse in a pulse compression radar device. For example, as shown in FIG. 3(b), an unmodulated pulse with a narrow pulse width and a modulated pulse with a wide pulse width are transmitted alternately, and a composite echo signal is produced by synthesizing an echo signal from a short distance obtained during the transmission and reception period of the unmodulated pulse and an echo signal from farther away obtained during the transmission and reception period of the modulated pulse. A radar image that is a combination of a short-distance radar image based on an unmodulated pulse and a far radar image based on a modulated pulse can be obtained, as shown in FIG. 4, by producing radar images on the basis of this composite echo signal. This allows targets to be detected at short to long distances.

With a pulse compression radar configured as above, since an echo from a short distance is an unmodulated echo, pulse compression offers no increase in S/N ratio. Therefore, echoes from a short distance are relatively susceptible to the effect of noise, but they also have a high signal level to start with, and tend not to be buried in noise, so there is no practical problem.

SUMMARY

As discussed above, with a pulse compression radar device, two kinds of pulse (unmodulated pulses and modulated pulses) are transmitted. Also, to achieve a "dual-screen simultaneous display mode," pulse signals are transmitted in two different pulse widths according to two display ranges (R1 and R2).

Figure 3C:
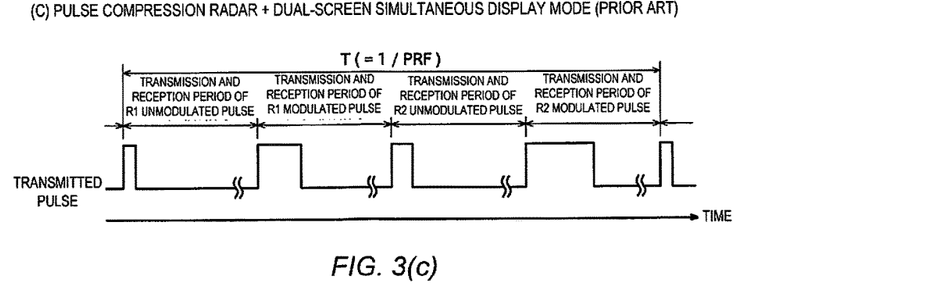

Although it is possible to achieve a "dual-screen simultaneous display mode" with a pulse compression radar device, in that case unmodulated pulses and modulated pulses are each transmitted in two different pulse widths, so a total of four kinds of pulse signal need to be transmitted in the right order. More specifically, as shown in FIG. 3(c), four kinds of pulse signal consisting of an R1 unmodulated pulse, an R1 modulated pulse, an R2 unmodulated pulse, and an R2 modulated pulse are transmitted in that order.

Because four different kinds of pulse signal are sent in a specific order, the transmission interval T of each pulse is longer, and the pulse repetition frequency PRF (=1/T) decreases. A decrease in the PRF leads to lower detection performance, less of an improvement in the S/C ratio of Doppler processing, and less of an improvement in the S/N ratio of coherent integration.

The present invention was conceived in light of the above situation, and it is an object thereof to provide a radar device that can selectively or simultaneously display radar images at a plurality of display ranges, and that is configured so that there is less of a decrease in the PRF.

The problem which the present invention attempts to solve is as discussed above, and the means for solving that problem, and the effect thereof, will now be described.

In one aspect of the present invention, a radar device configured as follows is provided. Specifically, this radar device comprises a transmitter, a receiver, a first radar image production component, a second radar image production component, a display component, and an echo width adjuster. The transmitter transmits a pulse signal. The receiver receives an echo signal during a transmission and reception period of the pulse signal. The first radar image production component produces a radar image of a first display range on the basis of the echo signal. The second radar image production component produces a radar image of a second display range that is wider than the first display range on the basis of the echo signal. The display component selectively or simultaneously displays the radar image of the first display range and the radar image of the second display range. The echo width adjuster adjusts pulse width of echo included in the radar images or the echo signal according to the display range of the radar image.

Specifically, with a conventional radar device, the pulse signals were transmitted at different pulse widths for each display range. By contrast, the configuration of the present invention is such that the width of echo included in the received echo signal is adjusted according to the display range. Since the pulse width of echo is thus adjusted after the fact, there is no need to transmit the pulse signal at different pulse widths for each display range. Therefore, fewer kinds of pulse signal need to be transmitted, and this prevents a decrease in the PRF.

With the above-mentioned radar device, it is preferable if the first radar image production component and the second radar image production component produce radar images of the display ranges on the basis of a shared echo signal.

Thus sharing the echo signal used for a plurality of different kinds of display range means that fewer kinds of pulse signal need to be transmitted, and this prevents a decrease in the PRF.

With the above-mentioned radar device, it is preferable if at least one of the first radar image production component and the second radar image production component produces a radar image on the basis of an echo signal in which the pulse width of the echo has been adjusted by the echo width adjuster.

Thus performing processing for adjusting the pulse width of echoes at a stage prior to the production of the radar image allows a radar image to be properly produced for each display range.

With the above-mentioned radar device, it is preferable if the configuration is as follows. Specifically, the transmitter transmits the pulse signal at a pulse width according to the first display range. The echo width adjuster extends the pulse width of the echo included in the echo signal up to a pulse width corresponding to the second display range. The first radar image production component produces the radar image of the first display range on the basis of an echo signal in which the pulse width of the echo has not been adjusted by the echo width adjuster. The second radar image production component produces the radar image of the second display range on the basis of an echo signal in which the pulse width of the echo has been extended by the echo width adjuster.

Thus transmitting a pulse signal at a pulse width corresponding to a first display range allows the radar image for the first display range to be produced as intended. Also, extending the width of an echo allows the echo width to be suited to the radar image of the second display range, which is wider than the first display range. This means that radar images of the second display range can also be produced properly.

With the above-mentioned radar device, it is preferable if the configuration is as follows. Specifically, the transmitter transmits at least an unmodulated pulse and a modulated pulse. The receiver receives an unmodulated echo signal during a transmission and reception period of the unmodulated pulses, and receives a modulated echo signal during a transmission and reception period of the modulated pulses. This radar device is equipped with a modulated echo signal processor configured to produce a compressed echo signal by subjecting the modulated echo signal to pulse compression. The first radar image production component and the second radar image production component each produce the radar image on the basis of the modulated echo signal and the compressed echo signal. The echo width adjuster adjusts the pulse width of an echo included in at least one of the modulated echo signal and the compressed echo signal according to the display range of the radar image.

With a pulse compression radar device, a minimum of two kinds of pulse signal need to be transmitted (unmodulated pulses and modulated pulses). In view of this, the effect of the present invention, which is to reduce the number of types of pulse that are transmitted and thereby suppress a decrease in the PRF, can be favorably achieved by applying the configuration of the present invention to a pulse compression radar device such as this.

With the above-mentioned radar device, it is preferable if the configuration is as follows. Specifically, this radar device comprises a pulse synthesizer configured to produce a composite echo signal by synthesizing the unmodulated echo signal and the compressed echo signal. The echo width adjuster adjusts the pulse width of an echo included in the composite echo signal according to the display range.

Since processing to adjust the echo width is performed after the synthesis of the unmodulated echo signal and the compressed echo signal, there is no need to perform processing individually on the unmodulated echo signal and the compressed echo signal. This simplifies the computation processing, and allows a more natural radar image to be produced.

In another aspect of the present invention, there is provided the following radar image display method. Specifically, this radar image display method includes a transmission step, a reception step, a first radar image production step, a second radar image production step, a display step, and an echo width adjustment step. In the transmission step, a pulse signal is transmitted. In the reception step, an echo signal is received during a transmission and reception period of the pulse signal. In the first radar image production step, a radar image of a first display range is produced on the basis of the echo signal. In the second radar image production step, a radar image of a second display range that is wider than the first display range is produced on the basis of the echo signal. In the display step, the radar image of the first display range and the radar image of the second display range are selectively or simultaneously displayed. In the echo width adjustment step, the pulse width of the echoes included in the echo signal or the radar image is adjusted according to the display range of the radar image.

DETAILED DESCRIPTION OF EMBODIMENTS

Figure 1:
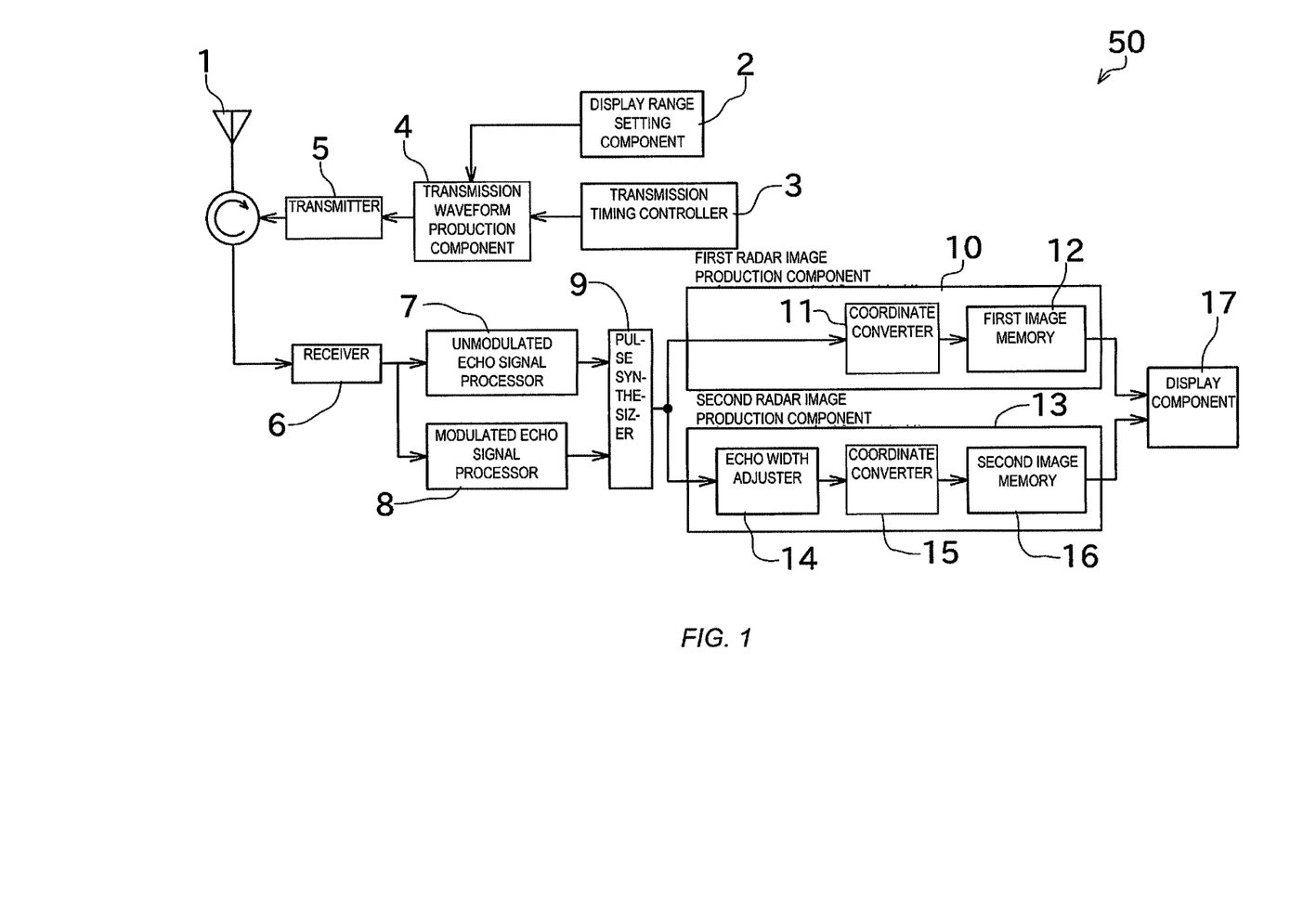
FIG. 1 is a block diagram of the radar device pertaining to an embodiment of the present invention.

An embodiment of the present invention will now be described through reference to the drawings. FIG. 1 is a block diagram of a radar device 50 pertaining to this embodiment. The radar device 50 in this embodiment is configured as a marine pulse radar device.

The radar device 50 in this embodiment is configured so that two radar images having mutually different display ranges are display next to each other at the same time in "dual-screen simultaneous display mode." The radar device 50 in this embodiment can also operate in normal mode in which just one radar image is displayed, but this is not described herein. The following description will focus exclusively on the configuration for achieving a "dual-screen simultaneous display mode."

An antenna 1 is configured to have sharp directionality and to be able to send and receive high-frequency signals. The antenna 1 has a known configuration in which the transmission and reception of signals is repeated while the antenna is turned in a horizontal plane at a specific period.

A display range setting component 2 sets the display range of the radar images displayed by the radar device 50. The user can select and set one or more display ranges from among a plurality of stages of display range, such as R1, R2, R3, and so on. Since a "dual-screen simultaneous display mode" is assumed here, the description will be of a situation in which two different display ranges (such as R1 and R2) are set in the display range setting component 2. The size relation between the display ranges is such that R1<R2.

A transmission timing controller 3 outputs a transmission trigger that controls the transmission timing of pulse signals transmitted from the antenna 1.

Figure 2:
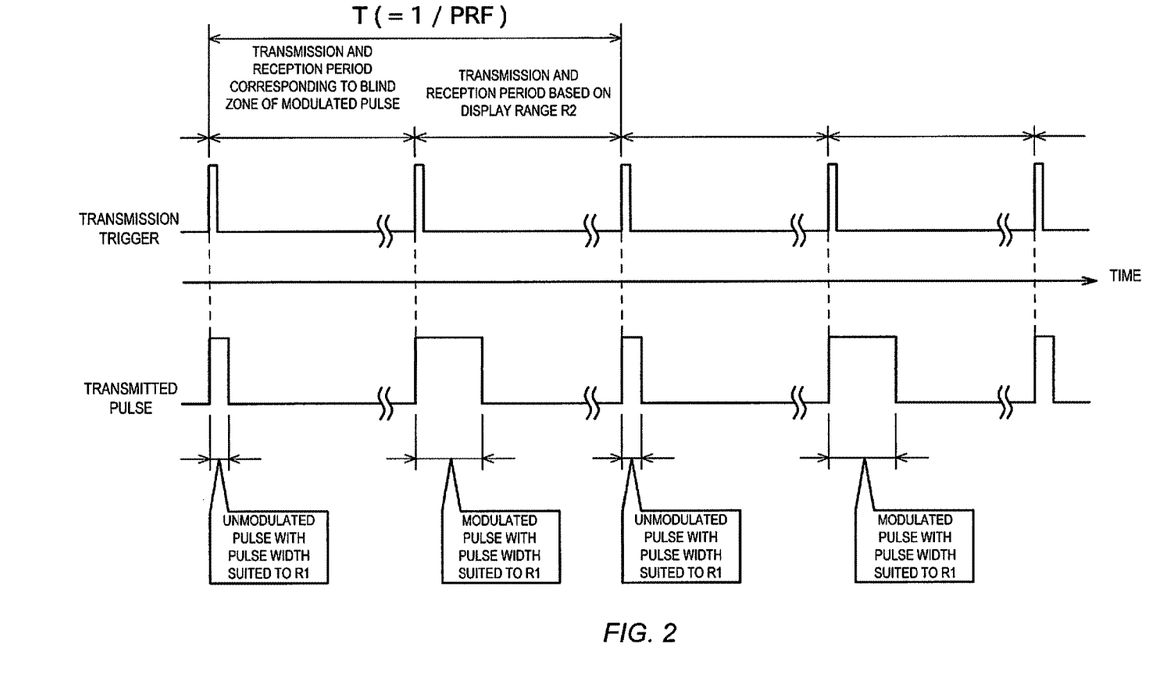
FIG. 2 is a graph of the relation between a transmission trigger and a pulse signal that transmits the radar image in this embodiment.

A transmission waveform production component 4 has an oscillator that generates a high-frequency signal. In this embodiment, a semiconductor (solid state) oscillator is employed, and is configured to be able to output high-frequency signals that have undergone frequency modulation. As shown in FIG. 2, the transmission waveform production component 4 is configured to output unmodulated pulses and modulated pulses alternately every time a transmission trigger is inputted from the transmission timing controller 3. An "unmodulated pulse" is a pulse-form signal with a constant carrier frequency (in which the frequency is not modulated). A "modulated pulse" is a pulse-form signal (such as a chirp signal) that has undergone frequency modulation so that the carrier frequency changes continuously over time.

A transmitter 5 amplifies the pulse signal (unmodulated pulse or modulated pulse) outputted by the transmission waveform production component 4, and outputs it to the antenna 1. As a result, unmodulated pulses and modulated pulses are alternately outputted from the antenna 1.

The period from when a certain pulse signal has been transmitted until the next pulse signal is transmitted is called the transmission and reception period of the pulse signal. The transmission timing controller 3 is configured to control the interval at which trigger signals are outputted according to the type of pulse signal outputted by the transmission waveform production component 4 (unmodulated pulse or modulated pulse). This allows the transmission and reception period of the pulse signals (unmodulated pulses and modulated pulses) to be properly controlled.

A series of signals received by the antenna 1 during the transmission and reception period of a certain pulse signal is called an "echo signal." For example, a series of signals received by the antenna 1 during the transmission and reception period of an unmodulated pulse is called an "unmodulated echo signal," and a series of signals received by the antenna 1 during the transmission and reception period of a modulated pulse is called a "modulated echo signal." Individual echoes included in the various echo signals (such as echoes from a target) are simply called "echoes."

A receiver 6 amplifies the echo signal (unmodulated echo signal or modulated echo signal) received by the antenna 1, and outputs it to an unmodulated echo signal processor 7 or a modulated echo signal processor 8.

The unmodulated echo signal processor 7 performs specific signal processing on unmodulated echo signals, and outputs these to a pulse synthesizer 9. Examples of this processing include sensitivity adjustment and clutter removal.

The modulated echo signal processor 8 performs pulse compression processing on a modulated echo signal, and outputs this to the pulse synthesizer 9. Since pulse compression processing is known, it will not be described here. The signal outputted by the modulated echo signal processor 8 is called a compressed echo signal.

The pulse synthesizer 9 outputs a composite echo signal obtained by synthesizing the unmodulated echo signal outputted by the unmodulated echo signal processor 7 and the compressed echo signal outputted by the modulated echo signal processor 8. This synthesis processing was described as prior art, and therefore will not be described again here.

A first radar image production component 10 is configured to produce a radar image in PPI (plan position indicator) scope format on the basis of the composite echo signal outputted by the pulse synthesizer 9. This first radar image production component 10 produces a radar image with the display range (the display range R1 in this embodiment) that is narrower out of the two display ranges set in the display range setting component 2. The radar image of the display range R1 produced by the first radar image production component 10 is stored in a first image memory 12.

A second radar image production component 13 is also configured to produce a radar image in PPI scope format on the basis of the composite echo signal outputted by the pulse synthesizer 9. This second radar image production component 13 produces a radar image of the wider display range (the display range R2 in this embodiment) out of the two display ranges set in the display range setting component 2. The radar image of the display range R2 produced by the second radar image production component 13 is stored in a second image memory 16.

The radar image of the display range R1 stored in the first image memory 12, and the radar image of the display range R2 stored in the second image memory 16 are each transferred to a display component 17. The display component 17 displays the radar image of the display range R1 and the radar image of the display range R2 next to each other at the same time.

Thus, the radar device 50 in this embodiment can achieve a "dual-screen simultaneous display mode" in which radar images of different display ranges are displayed simultaneously.

The characteristic features of the radar device 50 in this embodiment will now be described.

As already described, with a conventional radar device, the pulse width of transmitted pulse signals was changed for each display range of the radar image. Accordingly, when a dual-screen simultaneous display mode was to be used, it was necessary to transmit pulse signals with two different pulse widths according to the two kinds of display range, so more kinds of pulse signal had to be transmitted, and the PFR decreased.

In contrast, the radar device 50 in this embodiment is configured to adjust the pulse width of the echoes included in received echo signals according to the display range of the radar image.

That is, the radar device 50 in this embodiment adjusts the pulse width "after the fact," that is, after the echo signal has been received. Thus, since the radar device 50 in this embodiment adjusts the pulse width after the echo signal has been received, at the stage when the pulse signal is transmitted, there is no need to vary the pulse width for each display range.

In view of this, with the radar device 50 in this embodiment, as shown in FIG. 2, the configuration is such that a total of two kinds of pulse signal, consisting of unmodulated pulses with one kind of pulse width and modulated pulses of one kind of pulse width, are alternately transmitted. Because of the configuration of this embodiment, unmodulated pulses and modulated pulses may each be transmitted at one kind of pulse width.

As discussed above, the radar device 50 in this embodiment realizes a "dual-screen simultaneous display mode" in a pulse compression radar device, while only needing a total of two kinds of transmitted pulse signal, so the PRF can be increased over that of a conventional configuration (FIG. 3(c)) in which four kinds of pulse signal were transmitted in a specific order.

The pulse width of the pulse signal transmitted by the radar device 50 in this embodiment will now be described.

With the radar device 50 in this embodiment, since the pulse width of echoes included in received echo signals are adjusted after the fact according to the display range, the pulse width of a transmitted pulse signal does not need to be a pulse width that is suited to producing a radar image. However, of the two display ranges (R1 and R2), if the pulse signal is transmitted at the pulse width suited to one of these display ranges, then the radar image of that display range can be produced as it would be normally (without adjusting the pulse width of the echo).

In view of this, the transmission waveform production component 4 in this embodiment is configured to output a pulse signal at the pulse width suited to the narrowest display range (R1 in this embodiment) out of the plurality of display ranges set in the display range setting component 2 (R1 and R2 in this embodiment).

Specifically, as shown in FIG. 2, the transmission waveform production component 4 in this embodiment alternately outputs unmodulated pulses with a pulse width suited to the display range R1, and modulated pulses with a pulse width suited to the display range R1.

The configuration for producing a radar image on the basis of a received echo signal will now be described.

As discussed above, the unmodulated pulses and modulated pulses transmitted by the radar device 50 in this embodiment each have a pulse width suited to the display range R1. Therefore, the pulse width of an echo included in a composite echo signal (the output of the pulse synthesizer 9) obtained by the synthesis of echo signals received by the antenna 1 will be a pulse width that is suited to the display range R1.

In view of this, the first radar image production component 10 in this embodiment is configured to produce a radar image of the display range R1 by using a composite echo signal just as it is (without adjusting the pulse width of the echo).

The first radar image production component 10 comprises the above-mentioned first image memory 12 and a coordinate converter 11. The first image memory 12 is configured to store radar images as two-dimensional raster image data composed of a collection of digital pixel data expressed by an XY orthogonal coordinate system.

As is commonly known, with a pulse radar device such as in this embodiment, the echo signal received by the antenna can be expressed by an $r\theta$ coordinate system (polar coordinate system) (here, r is the distance to the echo generation source, and $\theta$ is the direction in which the antenna is facing). The coordinate converter 11 subjects the range corresponding to the display range R1 out of the composite echo signal of the $r\theta$ coordinate system outputted by the pulse synthesizer 9 to coordinate conversion into an orthogonal coordinate system, and stores this in the first image memory 12. Consequently, a radar image of the display range R1 is formed in PPI format in the first image memory 12. The configuration for producing a PPI format radar image by the coordinate conversion of the echo signal of an $r\theta$ coordinate system is known, and will therefore not be described in detail here.

Thus, the radar device 50 in this embodiment transmits a pulse signal at a pulse width that is suited to the display range R1, so a radar image of the display range R1 can be favorably produced on the basis of a composite echo signal by the same processing as with a conventional radar device.

Meanwhile, the unmodulated pulses and modulated pulses transmitted by the radar device 50 in this embodiment do not necessarily have a pulse width that is suited to the display range R2. Therefore, the pulse width of an echo included in a composite echo signal (the output of the pulse synthesizer 9) obtained by synthesis of an echo signal received by the antenna 1 will not be a pulse width that is suited to the display range R2. Accordingly, in producing a radar image of the display range R2, the pulse width of the echoes included in the composite echo signal will have to be adjusted.

In view of this, the second radar image production component 13 in this embodiment further comprises an echo width adjuster 14, in addition to a coordinate converter 15 and the second image memory 16.

The echo width adjuster 14 is configured to adjust the pulse width of the echoes included in the composite echo signal outputted by the pulse synthesizer 9, to be a pulse width that is suited to the display range R2.

As discussed above, the pulse width of the echoes included in the composite echo signal is a pulse width that is suited to the display range R1, which is narrower than the display range R2, so the signal-to-noise power ratio will be too low for a signal used for the display range R2. Therefore, if an echo with this pulse width should be used to produce a radar image of the display range R2, there is the risk of a decrease in the visibility of the echo image.

In view of this, the echo width adjuster 14 in this embodiment performs processing to extend the pulse width of the echoes included in the composite echo signal to a pulse width that is suited to the display range R2 (has high visibility).

The processing to extend the pulse width of the echoes included in the echo signal can be accomplished by using a known low-pass filter or a blur filter, such as a known averaging filter or Gaussian filter.

The second image memory 16 is configured to store radar images as two-dimensional raster image data composed of a collection of digital pixel data expressed by an XY orthogonal coordinate system.

The coordinate converter 15 subjects the range corresponding to the display range R2 out of the composite echo signal in which the echo has been extended by the echo width adjuster 14, to coordinate conversion and stores this in the second image memory 16. This forms a radar image of the display range R2 in PPI format in the second image memory 16.

Thus, with the radar device 50 in this embodiment, the pulse width of the echoes included in a composite echo signal is extended to a pulse width that is suited to the display range R2, which improves the visibility of the echo image in a radar image of the display range R2, so a favorable radar image of the display range R2 can be produced and displayed.

As discussed above, the first radar image production component 10 and the second radar image production component 13 in this embodiment produce radar images of display ranges on the basis of a shared echo signal (more specifically, a composite echo signal). Thus producing radar images for a plurality of display ranges on the basis of a shared echo signal reduces the number of kinds of echo signal that are required. As a result, fewer kinds of pulse signal have to be transmitted, and a reduction in the PRF can be suppressed.

The transmission and reception period of the pulse signals will now be described.

As is commonly known, to favorably receive echoes from farther away, the transmission and reception period of the pulse signals (the period up until the next pulse signal is transmitted) is made longer. In the case of this embodiment, since a shared pulse signal is utilized to produce radar images of two display ranges (R1 and R2), a transmission and reception period needs to be set that is capable of covering both of these display ranges (R1 and R2). Since R1<R2 here, the transmission and reception period of the pulse signal is preferably set using R2 (the wider display range) as a reference.

In view of this, in this embodiment the transmission and reception period of a modulated pulse is set to be either the same as or longer than the display range R2. This allows echoes within the display ranges R1 and R2 to be reliably received during the transmission and reception period of modulated pulses.

The transmission and reception period of unmodulated pulses may be wider than the pulse width of the modulated pulses. As discussed above, this is because during the transmission and reception period of unmodulated pulses, it is sufficient to be able to receive echoes from a blind zone corresponding to the pulse width of modulated pulses.

With the radar device 50 of this embodiment described above, the following radar image display method can be realized. Specifically, this radar image display method includes a transmission step, a reception step, a first radar image production step, a second radar image production step, a display step, and an echo width adjustment step.

In the transmission step, the transmitter 5 transmits a pulse signal at a pulse width corresponding to the display range R1. In the reception step, the receiver 6 receives an echo signal during the transmission and reception period of the above-mentioned pulse signal.

In the echo width adjustment step, the echo width adjuster 14 adjusts the pulse width of the echoes included in the echo signal according to the display range R2.

In the first radar image production step, the first radar image production component 10 produces a radar image of the display range R1 on the basis of an echo signal in which the pulse width of the echoes has not been adjusted by the echo width adjuster 14.

In the second radar image production step, the second radar image production component 13 produces a radar image of the display range R2 on the basis of an echo signal in which the pulse width of the echoes has been adjusted by the echo width adjuster 14.

In the display step, the display component 17 simultaneously displays a radar image of the display range R1 and a radar image of the display range R2.

With this radar image display method, radar images can be displayed for the display ranges R1 and R2 at the same time. Also, since this method eliminates the need to transmit a pulse signal of a different pulse width for each display range, fewer kinds of pulse signal need to be transmitted, and this prevents a decrease in the PRF.

A preferred embodiment of the present invention was described above, but the above configuration can be modified as follows, for example.

The configuration of the present invention is not limited to marine radar devices, and can be widely utilized in radar devices in other applications.

In the above embodiment, the configuration was such that radar images of two display ranges were displayed simultaneously on the display component 17, but this is not the only option. For instance, the display component 17 may be configured to selectively switch between displaying a radar image of the display range R1 and a radar image of the display range R2.

In FIG. 1, the first radar image production component 10 and the second radar image production component 13 are depicted as separate blocks, but the radar image production components 10 and 13 do not have to be separately configured. Specifically, the functions of both the first radar image production component 10 and the second radar image production component 13 may be realized by processing with a single radar image production component in time series.

In the above embodiment, the configuration was such that radar images of two kinds of display range (R1 and R2) were simultaneously (or selectively) displayed, but the present invention can also be applied to a configuration in which radar images of three or more kinds of display range are simultaneously (or selectively) displayed. That is, the device may further comprise a third radar image production component for producing a radar image of a third display range, a fourth radar image production component for producing a radar image of a fourth display range, and so forth.

Figure 5:
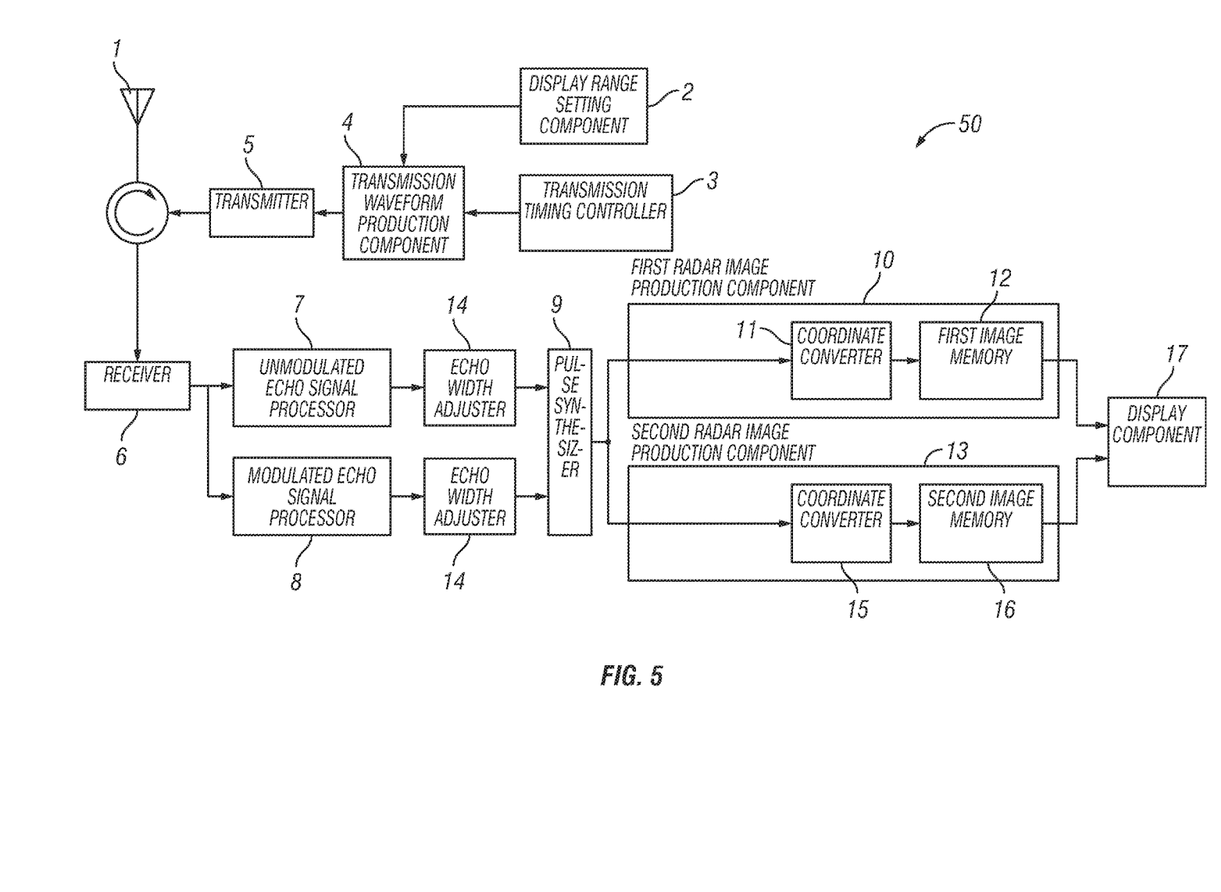
FIG. 5 is a modification to the embodiment shown in FIG. 1.

In the above embodiment, the echo width adjuster 14 performed processing to adjust the pulse width of a composite echo signal (the output of the pulse synthesizer 9). However, as shown in FIG. 5, instead of this, processing may be performed by echo width adjusters 14 to adjust the pulse widths of an unmodulated echo signal outputted by the unmodulated echo signal processor 7 and a compressed echo signal outputted by the modulated echo signal processor 8, after which the two are synthesized by the pulse synthesizer 9 to produce a composite echo signal.

Also, for example, processing may be performed to adjust the pulse signal of an echo image according to the display range, for radar images of an orthogonal coordinate system produced by the image memories 12 and 16.

In the above embodiment, radar images of two display ranges (R1 and R2) were produced on the basis of the same unmodulated pulses and modulated pulses. That is, two display ranges share the same unmodulated pulses and modulated pulses. This is not the only option, however, and only the modulated pulses may be shared, for example, and the unmodulated pulses not shared. Specifically, in this case, three kinds of pulse signal, namely, an R1 unmodulated pulse, an R2 unmodulated pulse, and an unmodulated pulse for both R1 and R2, are transmitted in order. Since there are three kinds of pulse, the PFR is lower than in the above embodiment, but an advantage is that unmodulated pulses can undergo signal processing (sensitivity adjustment, clutter removal processing) with different parameters for R1 and R2.

The echo width adjuster 14 in the above embodiment performed processing to extend the pulse width of echoes included in the echo signal, but conversely, it may perform processing to shorten the pulse width of the echoes.

Figure 6:
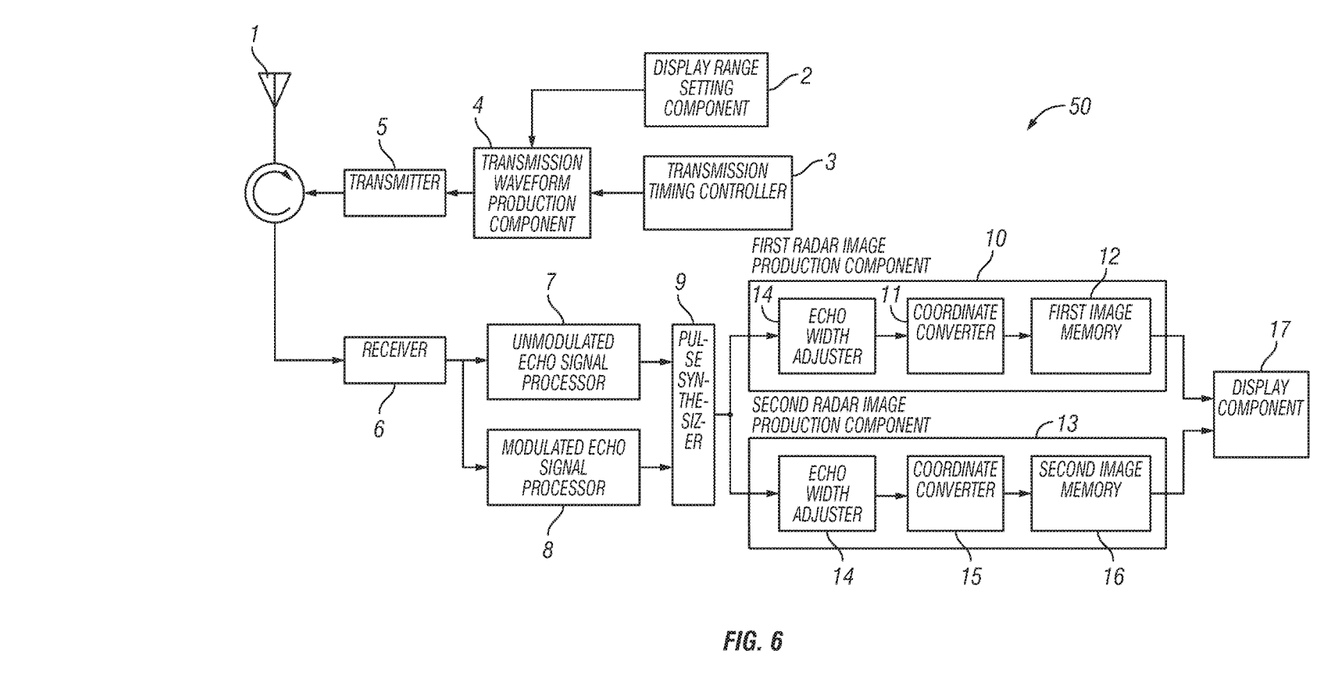
FIG. 6 is another modification to the embodiment shown in FIG. 1.

Also, in the above embodiment in producing a radar image for the display range R1, no processing was performed to adjust the pulse width of the echoes. This is not the only option, however, and processing may be performed by echo width adjusters 14 to adjust the pulse width of echoes for both of the display ranges R1 and R2, for example, as shown in FIG. 6.

The radar device in the above embodiment was configured as a pulse compression radar that transmitted unmodulated pulses and modulated pulses, but this is not the only option, and it may instead be an ordinary radar that transmits only unmodulated pulses, for example, in which case applying the present invention will have the same effect of preventing a decrease in PRF.

The invention claimed is:

1. A radar device comprising:
   a transmitter configured to transmit a pulse signal including an unmodulated pulse with one kind of pulse width and a modulated pulse with one kind of pulse width;
   a receiver configured to receive an echo signal during a transmission and reception period of the pulse signal;
   a first radar image production component configured to produce a radar image of a first display range on the basis of the echo signal;
   a second radar image production component configured to produce a radar image of a second display range that is wider than the first display range on the basis of the echo signal;
   a display component configured to selectively or simultaneously display the radar image of the first display range and the radar image of the second display range; and
   an echo width adjuster configured to adjust pulse width of echo being included in the radar images or to adjust pulse width of the echo signal, according to the display range of the radar image;
   wherein the first radar image production component and the second radar image production component produce radar images of the display ranges on the basis of a shared echo signal.

2. The radar device according to claim 1, wherein
   at least one of the first radar image production component and the second radar image production component produces a radar image on the basis of the echo signal in which the pulse width of the echo has been adjusted by the echo width adjuster.

3. The radar device according to claim 2, wherein
   the transmitter transmits the pulse signal at a pulse width according to the first display range,
   the echo width adjuster extends the pulse width of the echo included in the echo signal up to a pulse width corresponding to the second display range,
   the first radar image production component produces the radar image of the first display range on the basis of an echo signal in which the pulse width of the echo has not been adjusted by the echo width adjuster, and
   the second radar image production component produces the radar image of the second display range on the basis of an echo signal in which the pulse width of the echo has been extended by the echo width adjuster.

4. The radar device according to claim 1, wherein
   the receiver receives an unmodulated echo signal during a transmission and reception period of the unmodulated pulses, and receives a modulated echo signal during a transmission and reception period of the modulated pulses,
   there is provided a modulated echo signal processor configured to produce a compressed echo signal by subjecting the modulated echo signal to pulse compression,
   the first radar image production component and the second radar image production component each produce the radar image on the basis of the modulated echo signal and the compressed echo signal, and
   the echo width adjuster adjusts the pulse width of an echo included in at least one of the modulated echo signal and the compressed echo signal according to the display range of the radar image.

5. The radar device according to claim 4, comprising
   a pulse synthesizer configured to produce a composite echo signal by synthesizing the unmodulated echo signal and the compressed echo signal,
   wherein the echo width adjuster adjusts the pulse width of an echo included in the composite echo signal according to the display range.

6. A radar image display method comprising:
   transmitting a pulse signal including an unmodulated pulse with one kind of pulse width and a modulated pulse with one kind of pulse width;
   receiving an echo signal during a transmission and reception period of the pulse signal;
   producing a radar image of a first display range on the basis of the echo signal;
   producing a radar image of a second display range that is wider than the first display range on the basis of the echo signal;
   selectively or simultaneously displaying the radar image of the first display range and the radar image of the second display range; and
   adjusting pulse width of the echo signal or pulse width of the echo being included in the radar image, according to the display range of the radar image;
   wherein the radar images of the first and second display ranges are produced on the basis of a shared echo signal.

7. The radar device according to claim 2, wherein
the receiver receives an unmodulated echo signal during a transmission and reception period of the unmodulated pulses, and receives a modulated echo signal during a transmission and reception period of the modulated pulses,
there is provided a modulated echo signal processor configured to produce a compressed echo signal by subjecting the modulated echo signal to pulse compression,
the first radar image production component and the second radar image production component each produce the radar image on the basis of the modulated echo signal and the compressed echo signal, and
the echo width adjuster adjusts the pulse width of an echo included in at least one of the modulated echo signal and the compressed echo signal according to the display range of the radar image.

8. The radar device according to claim 3, wherein
the receiver receives an unmodulated echo signal during a transmission and reception period of the unmodulated pulses, and receives a modulated echo signal during a transmission and reception period of the modulated pulses,
there is provided a modulated echo signal processor configured to produce a compressed echo signal by subjecting the modulated echo signal to pulse compression,
the first radar image production component and the second radar image production component each produce the radar image on the basis of the modulated echo signal and the compressed echo signal, and
the echo width adjuster adjusts the pulse width of an echo included in at least one of the modulated echo signal and the compressed echo signal according to the display range of the radar image.

9. The radar device according to claim 7, comprising
a pulse synthesizer configured to produce a composite echo signal by synthesizing the unmodulated echo signal and the compressed echo signal,
wherein the echo width adjuster adjusts the pulse width of an echo included in the composite echo signal according to the display range.

10. The radar device according to claim 8, comprising
a pulse synthesizer configured to produce a composite echo signal by synthesizing the unmodulated echo signal and the compressed echo signal,
wherein the echo width adjuster adjusts the pulse width of an echo included in the composite echo signal according to the display range.

11. The radar device according to claim 1, wherein
a part or all of an area indicated by the radar image displayed in the first display range is the same as a part or all of an area indicated by the radar image displayed in the second display range.

12. A radar device comprising:
a transmitter configured to transmit a pulse signal including an unmodulated pulse with one kind of pulse width and a modulated pulse with one kind of pulse width;
a receiver configured to receive an echo signal during a transmission and reception period of the pulse signal;
a first radar image production component configured to produce a radar image of a first display range on the basis of the echo signal;
a second radar image production component configured to produce a radar image of a second display range that is wider than the first display range on the basis of the echo signal;
a display component configured to selectively or simultaneously display the radar image of the first display range and the radar image of the second display range; and
an echo width adjuster configured to adjust pulse width of echo being included in the radar images or to adjust pulse width of the echo signal, according to the display range of the radar image; and
wherein at least one of the first radar image production component and the second radar image production component produces a radar image on the basis of the echo signal in which the pulse width of the echo has been adjusted by the echo width adjuster.

* * * * *